UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 724,234, dated March 31, 1903.

Application filed July 21, 1902. Serial No. 116,455. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in compositions of matter to be used for pigments and in the process of making the same; and it consists, respectively, in the novel product and in the new steps more fully set forth in the specification and pointed out in the claims.

The composition consists of an intimate mixture of the precipitates of barium carbonate and zinc hydrate in proportions determined by the molecular combination of the soluble salts from which the precipitates are derived. In the preparation of my compound I employ mixtures of solutions of barium hydrate, sodium carbonate, and zinc chlorid, (or equivalent soluble salt,) whereupon there results a compound precipitate of barium carbonate and zinc hydrate, leaving in solution sodium chlorid. In lieu of sodium carbonate I may, of course, employ a carbonate of any of the alkali metals—for example, potassium carbonate or ammonium carbonate—and in lieu of zinc chlorid I may employ the sulfate, acetate, nitrate, or other soluble salt of that metal without affecting the nature or spirit of my invention. The precipitates referred to may be formed consecutively in any order which practical considerations may dictate, or they may be formed simultaneously. In the first instance an intimate mixture thereof may be effected by grinding or any form of mechanical agitation. In the second instance the mixture is effected in the act of precipitation.

As an illustration of the consecutive order of precipitation wherein the zinc hydrate is formed first and the barium carbonate last, I prepare one molecular equivalent of an aqueous solution of barium hydrate and one molecular equivalent of zinc chlorid and mix them, whereby there results a precipitate of one molecular equivalent of zinc hydrate and a solution of one molecular equivalent of barium chlorid. To this solution is then added one molecular equivalent of sodium carbonate, whereupon there is precipitated one molecular equivalent of barium carbonate, leaving two molecular equivalents of sodium chlorid in solution. Thus formed, the two precipitates can be brought into intimate mixture either while subsiding or after subsidation has taken place and the waste solution separated by any suitable means of agitation, or the compound precipitate after being dried can be brought into more intimate mixture by grinding or other suitable means. The chemical reactions above referred to may be expressed as follows:

$$Ba(OH)_2 + ZnCl_2 = Zn(OH)_2 + BaCl_2;$$

$$BaCl_2 + Na_2CO_3 = BaCO_3 + 2NaCl.$$

As an illustration of the consecutive order of precipitation where the barium carbonate is formed first and the zinc hydrate last, I mix together aqueous solutions of one molecular equivalent each of barium hydrate and sodium carbonate, whereupon there is precipitated one molecular equivalent of barium carbonate, leaving two molecular equivalents of sodium hydrate in solution. To the latter is added one molecular equivalent of zinc chlorid, whereupon there is precipitated one molecular equivalent of zinc hydrate, leaving two molecular equivalents of sodium chlorid in solution, the precipitate being separated by running off the solution and washing. The reactions covering the latter modification may be expressed as follows:

$$Ba(OH)_2 + Na_2CO_3 = BaCO_3 + 2Na(OH);$$

$$2Na(OH) + ZnCl_2 = Zn(OH)_2 + 2NaCl.$$

Should it be desirable, on the other hand, to effect a substantially simultaneous precipitation of the barium carbonate and zinc hydrate, so as to insure an intimate mixture between them in the act of precipitation, I mix the several solutions at one time, the precipitates forming practically at the same time. This condition may be expressed by the following reaction:

$$Na_2CO_3 + Ba(OH)_2 + ZnCl_2 = BaCO_3 + Zn(OH)_2 + 2NaCl.$$

It is of course obvious that I may substitute the carbonates of any of the alkali metals for the sodium carbonate. I may also substitute for the zinc chlorid the acetate, nitrate, or sulfate of zinc, producing a corresponding acetate, nitrate, or sulfate of the alkali metal in the final solution in lieu of the chlorid of sodium, as above specified. In employing the zinc sulfate, however, the introduction thereof must not take place until after the formation of the barium carbonate, for owing to the affinity existing between the sulfate radical and the barium base there would result the formation of barium sulfate, which is to be avoided, a fact apparent from the following reaction:

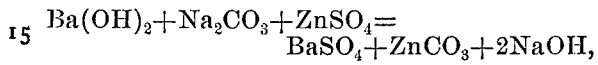

so that in the event the sulfate of zinc is used the process must be carried out in the order shown by the following reaction:

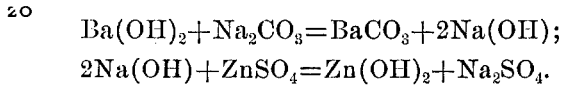

The determination of the actual quantities of the materials used in the foregoing reactions are simple stoichiometric problems based upon the atomic weights of the elements constituting any molecule, and as a commercial illustration of the formula contained in the first three of the above reactions the following may be cited: I prepare separate aqueous solutions of the following ingredients in the proportions named—viz., barium hydrate, one hundred and seventy-one (171) pounds; sodium carbonate, one hundred and six (106) pounds; zinc chlorid, one hundred and thirty-six (136) pounds. These solutions are brought together as specified, whereupon there results a precipitate of one hundred and ninety-seven (197) pounds of barium carbonate and a precipitate of ninety-nine (99) pounds of zinc hydrate and a solution of one hundred and seventeen (117) pounds of sodium chlorid. When zinc sulfate is used, sodium sulfate will be left in the final solution, when zinc acetate is used acetate of soda will be formed in the solution, when nitrate of zinc is used the nitrate of soda will be formed in the final solution, and so on, depending, of course, on the nature of the soluble salt of zinc used. If potassium or ammonium is substituted for the sodium in the carbonate, of course a corresponding change will take place in the base of the salt remaining in the final solution, as is obvious.

It is of course apparent that I may invoke the doctrine of chemical equivalents wherever the same may apply.

Having described my invention, what I claim is—

1. The process of making pigment which consists in mixing solutions of barium hydrate, a carbonate of an alkali metal, and a salt of zinc, and recovering the resulting precipitates, substantially as set forth.

2. The process of making pigment which consists in mixing solutions of barium hydrate, a carbonate of an alkali metal and zinc chlorid, and recovering the resulting precipitates, substantially as set forth.

3. The process of making pigment which consists in mixing solutions of barium hydrate, sodium carbonate and zinc chlorid, and recovering the resulting precipitates, substantially as set forth.

4. The process of making pigment which consists in mixing solutions of the proper molecular equivalents of barium hydrate, a carbonate of an alkali metal, and a salt of zinc, and recovering the resulting precipitates, substantially as set forth.

5. The process of making pigment which consists in mixing a solution of one molecular equivalent of barium hydrate, one equivalent of the carbonate of an alkali metal and one equivalent of zinc chlorid, and recovering the resulting precipitates, substantially as set forth.

6. A pigment comprising a mixture of barium carbonate, and zinc hydrate, substantially as set forth.

7. A pigment comprising a mixture of precipitated barium carbonate, and precipitated zinc hydrate, substantially as set forth.

8. A pigment comprising a mixture of the molecular equivalents of barium carbonate, and zinc hydrate, substantially as set forth.

In testimony whereof I affix my signature in presence of two witnesses.

WILLIAM J. ARMBRUSTER.

Witnesses:
 EMIL STAREK,
 G. L. BELFRY.